(12) United States Patent
Alshehri

(10) Patent No.: US 12,055,956 B2
(45) Date of Patent: *Aug. 6, 2024

(54) REJECTED GAS RECOVERY IN GAS OIL SEPARATION PLANTS

(71) Applicant: Saudi Arabian Oil Company, Dhahran (SA)

(72) Inventor: Abdulrahman Ali Alshehri, Udhailiyah (SA)

(73) Assignee: Saudi Arabian Oil Company, Dhahran (SA)

(*) Notice: Subject to any disclaimer, the term of this patent is extended or adjusted under 35 U.S.C. 154(b) by 2 days.

This patent is subject to a terminal disclaimer.

(21) Appl. No.: 17/816,578

(22) Filed: Aug. 1, 2022

(65) Prior Publication Data
US 2024/0036593 A1    Feb. 1, 2024

(51) Int. Cl.
*E21B 43/34* (2006.01)
*G05D 16/20* (2006.01)

(52) U.S. Cl.
CPC ............ G05D 16/204 (2013.01); *E21B 43/34* (2013.01)

(58) Field of Classification Search
CPC .............................. E21B 43/34; G05D 16/204
See application file for complete search history.

(56) References Cited

U.S. PATENT DOCUMENTS

| | | | |
|---|---|---|---|
| 2002/0139248 A1* | 10/2002 | Choi | E21B 43/124 96/193 |
| 2007/0158075 A1* | 7/2007 | Beg | E21B 43/124 166/265 |
| 2016/0265322 A1* | 9/2016 | Beg | F04F 5/48 |
| 2021/0002558 A1* | 1/2021 | Soliman | C10G 31/06 |
| 2021/0115774 A1 | 4/2021 | Al-Wadie | |
| 2021/0309922 A1* | 10/2021 | Soliman | B01D 17/042 |

OTHER PUBLICATIONS

Villa et al., "Ejectors for boosting low-pressure oil wells," SPE Production & Facilities, Nov. 1999, 14(4):229-234, 6 pages.
www.transvac.co.uk [online], "Flare gas recovery ejector project wins high-profile award at Adipec," Apr. 2021, retrieved on Jul. 12, 2022, retrieved from URL <https://www.transvac.co.uk/flare-gas-recovery-ejector-project-wins-high-profile-award-at-adipec/>, 4 pages.

(Continued)

*Primary Examiner* — Silvana C Runyan
(74) *Attorney, Agent, or Firm* — Fish & Richardson P.C.

(57) ABSTRACT

Rejected gas recovery in gas-oil separation plants (GOSPs) is implemented. A gas phase is flowed from a GOSP to a central gas plant through a first gas flow pathway at a first flow pressure. Gas from a gas reservoir is flowed through a second gas flow pathway at a second flow pressure. The first gas flow pathway is separate from the second gas flow pathway. While flowing the gas phase through the first gas flow pathway, a decrease in the first flow pressure below a threshold flow pressure is determined. In response, a gas-gas ejector, which is fluidically coupled to the first gas flow pathway and the second gas flow pathway, is operated to drive a flow of the gas phase to the central gas plant using gas from the gas reservoir as a motive gas.

6 Claims, 6 Drawing Sheets

(56) References Cited

OTHER PUBLICATIONS www.transvac.co.uk [online], "Ejectors for oil & gas industry," retrieved on Jun. 13, 2022, retrieved from URL <https://www.transvac.co.uk/wp-content/uploads/Transvac-Ejectors-Oil-Gas-Solutions-Small.pdf>, 17 pages.

www.transvac.co.uk [online], "Enhanced recovery & production boosting using ejectors," 2021, retrieved on Feb. 5, 2024, retrieved from URL <https://www.transvac.co.uk/production-boosting/>, 13 pages.

\* cited by examiner

REJECTED GAS RECOVERY IN GAS OIL SEPARATION PLANTS

TECHNICAL FIELD

This disclosure relates to managing gas phases obtained from gas oil separation plants (GOSPs).

BACKGROUND

Hydrocarbons (e.g., oil product, natural gas, combinations of them) entrapped in subsurface reservoirs are raised to the surface (i.e., produced) through wellbores formed from the surface to the subsurface reservoirs through a subterranean zone (e.g., a formation, a portion of a formation or multiple formations). Often, the produced hydrocarbons are multiphase fluids that include a liquid phase and a gas phase. The liquid phase can include the oil product and formation water. In operation, the multiphase hydrocarbons are flowed to GOSPs for separation into their individual phases. In addition, the liquid phase is separated into oil product and formation water. The oil product is transported to a stabilization plant for further treatment. The formation water is injected back into the subterranean zone. The gas phase is transported to a central gas plant for further processing. Portions of the gas phase that cannot be transported to the central gas plant are rejected by flaring those portions using a flare system.

SUMMARY

This disclosure describes technologies relating to the rejected gas recovery in GOSPs.

Certain aspects of the subject matter described here can be implemented as a gas flow system that includes a GOSP configured to separate multiphase hydrocarbon into a gas phase and a liquid phase. A first gas flow pathway is fluidically coupled to the GOSP and configured to receive the gas phase from the GOSP and to flow the gas phase to a central gas plant at a first flow pressure. A second gas flow pathway is fluidically coupled to a gas reservoir and configured to flow gas from the gas reservoir to the central gas plant at a second flow pressure greater than the first flow pressure. A gas-gas ejector is fluidically coupled to the first gas flow pathway and the second gas flow pathway. The gas-gas ejector is configured to drive gas flow using the gas from the gas reservoir as a motive gas. A controller is operatively coupled to the GOSP and the gas-gas ejector. The controller includes one or more computer systems and a computer-readable medium storing computer instructions executable by the one or more computer systems to perform operations. The operations include determining a decrease in the first flow pressure below a threshold flow pressure. In response to determining the decrease in the first flow pressure below the threshold flow pressure, the operations include operating the gas-gas ejector to operate to drive a flow of the gas phase to the central gas plant using gas from the gas reservoir as a motive gas.

An aspect combinable with any other aspect includes the following features. The system includes a gas compressor fluidically coupled to the first gas flow pathway. The gas compressor is configured to flow the gas phase to the central gas plant at the first flow pressure. To determine the decrease in the first flow pressure below the threshold flow pressure, a change in normal operation of the gas compressor is determined.

An aspect combinable with any other aspect includes the following features. A third gas flow pathway is fluidically coupled to the second gas flow pathway and to a motive gas inlet of the gas-gas ejector. A first flow control valve is fluidically coupled to the third gas flow pathway and operatively coupled to the controller. To operate the gas-gas ejector, opening and closing of the first flow control valve is controlled.

An aspect combinable with any other aspect includes the following features. In an open state, the first flow control valve is configured to divert a portion of the gas from the gas reservoir to the motive gas inlet of the gas-gas ejector. In a closed state, the flow control valve is configured to cease flow of the portion of the gas from the gas reservoir to the motive gas inlet of the gas-gas ejector.

An aspect combinable with any other aspect includes the following features. A fourth gas flow pathway is fluidically coupled to the first gas flow pathway and to a driven gas inlet of the gas-gas ejector. A second flow control valve is fluidically coupled to the fourth gas flow pathway and operatively coupled to the controller. To operate the gas-gas ejector, opening and closing of the second flow control valve is controlled.

An aspect combinable with any other aspect includes the following features. In an open state, the second flow control valve is configured to divert the gas phase from flowing to the central gas plant to flowing to the driven gas inlet of the gas-gas ejector. In a closed state, the second flow control valve is configured to divert the gas phase from flowing to the driven gas inlet of the gas-gas ejector to flowing to the central gas plant.

Certain aspects of the subject matter described here can be implemented as a method. A gas phase is flowed from a GOSP to a central gas plant through a first gas flow pathway at a first flow pressure. Gas from a gas reservoir is flowed through a second gas flow pathway at a second flow pressure. The first gas flow pathway is separate from the second gas flow pathway. While flowing the gas phase through the first gas flow pathway, a decrease in the first flow pressure below a threshold flow pressure is determined. In response, a gas-gas ejector, which is fluidically coupled to the first gas flow pathway and the second gas flow pathway, is operated to drive a flow of the gas phase to the central gas plant using gas from the gas reservoir as a motive gas.

An aspect combinable with any other aspect includes the following features. A gas compressor, fluidically coupled to the first gas flow pathway, flows the gas phase to the central gas plant at the first flow pressure. The decrease in the first flow pressure below the threshold flow pressure is determined by determining a change in normal operation of the gas compressor.

An aspect combinable with any other aspect includes the following features. The normal operation of the gas compressor includes an operation at a maximum flow pressure at which the gas compressor is rated to operate. To determine the change in the normal operation, it is determined that the gas compressor is operating at a flow pressure different from the maximum flow pressure.

An aspect combinable with any other aspect includes the following features. To operate the gas-gas ejector, a first flow control valve, which controls flow through a third gas flow pathway fluidically coupled to the second flow pathway and to a motive gas inlet of the gas-gas ejector is opened, to flow a portion of the gas from the gas reservoir to the motive gas inlet of the gas-gas ejector.

An aspect combinable with any other aspect includes the following features. To operate the gas-gas ejector, a second flow control valve, which controls flow through a fourth gas flow pathway fluidically coupled to the first gas flow pathway and to a driven gas inlet of the gas-gas ejector, is opened to divert the gas phase from flowing to the central gas plant to flowing to the driven gas inlet of the gas-gas ejector.

An aspect combinable with any other aspect includes the following features. While operating the gas-gas ejector, a flow pressure through the first gas flow pathway is periodically monitored. In response to periodically monitoring the flow pressure, it is determined that the flow pressure of the gas phase exceeds the threshold flow pressure. In response to determining that the flow pressure of the gas phase exceeds the threshold flow pressure, the gas phase is flowed to the central gas plant while avoiding flow of the gas phase through the gas-gas ejector.

Certain aspects of the subject matter described here can be implemented as a non-transitory computer-readable medium storing instructions executable by one or more computer systems to perform operations. The operations include receiving signals representing flow pressure of a gas phase flowing through a first gas flow pathway from a GOSP to a central gas plant. While the gas phase is flowed to the central gas plant, gas from a gas reservoir is flowed through a second gas flow pathway from a gas reservoir to the central gas plant. At a first time instant, it is determined that the flow pressure is less than a threshold flow pressure. In response, control signals are transmitted to operate a gas-gas ejector fluidically coupled to the first gas flow pathway and the second gas flow pathway, to drive a flow of the gas phase to the central gas plant using gas from the gas reservoir as a motive gas.

An aspect combinable with any other aspect includes the following features. A third gas flow pathway fluidically couples the second gas flow pathway to a motive gas inlet of the gas-gas ejector. A first flow control valve fluidically couples to the third gas flow pathway. To transmit control signals to operate the gas-gas ejector, control signals are transmitted to open the first flow control valve to divert a portion of the gas from the gas reservoir to the motive gas inlet of the gas-gas ejector.

An aspect combinable with any other aspect includes the following features. A fourth gas flow pathway fluidically couples the first gas flow pathway to a driven gas inlet of the gas-gas ejector. A second flow control valve fluidically couples the first gas flow pathway to a driven gas inlet of the gas-gas ejector. A second flow control valve fluidically couples to the fourth gas flow pathway. To transmit control signals to operate the gas-gas ejector, control signals are transmitted to open the second flow control valve to divert the gas phase from flowing to the central gas plant to flowing to the driven gas inlet of the gas-gas ejector.

An aspect combinable with any other aspect includes the following features. At a second time instant after the first time instant, it is determined that the flow pressure is greater than the threshold flow pressure. In response, control signals are transmitted to close the first flow control valve and the second flow control valve.

An aspect combinable with any other aspect includes the following features. To receive signals representing flow pressure of the gas phase flowing through the first gas flow pathway, signals are received from pressure sensors fluidically coupled to the first gas flow pathway.

Certain aspects of the subject matter described here can be implemented as a gas flow system. The system includes multiple GOSPs, each configured to separate multiphase hydrocarbon into a gas phase and a liquid phase. Multiple first gas flow pathways are fluidically coupled to the respective multiple GOSPs. Each first gas flow pathway is configured to receive the gas phase from a respective GOSP of the multiple GOSPs at a respective first flow pressure. A second gas flow pathway is fluidically coupled to each first gas flow pathway of the multiple first gas flow pathways. The second gas flow pathway is configured to flow the gas phase received from each first gas flow pathway to a central gas plant at a second flow pressure greater than each first flow pressure in each first gas flow pathway. A gas-gas ejector is fluidically coupled to one of the multiple first gas flow pathway and to the second gas flow pathway. The gas-gas ejector is configured to drive gas flow using the gas phase flowed through the second gas flow pathway as a motive gas. A controller is operatively coupled to the GOSP and the gas-gas ejector. The controller includes one or more gas systems and a computer-readable medium storing computer instructions executable by the one or more computer systems to perform operations. The operations include determining a decrease in the first flow pressure of the one of the multiple first gas flow pathways to which the gas-gas ejector is coupled to below a threshold flow pressure. The operations include, in response, operating the gas-gas ejector to operate to drive a flow of the gas phase from the one of the multiple first gas flow pathways to the central gas plant using the gas phase in the second gas flow pathway as a motive gas.

An aspect combinable with any other aspect includes the following features. A gas compressor is fluidically coupled to the one of the multiple first gas flow pathways. The gas compressor is configured to flow the gas phase to the second gas flow pathway at the first flow pressure. To determine the decrease in the first flow pressure below the threshold flow pressure, a change in normal operation of the gas compressor is determined.

An aspect combinable with any other aspect includes the following features. The normal operation of the gas compressor includes an operation at a maximum flow pressure at which the gas compressor is rated to operate. To determine the change in the normal operation, it is determined that the gas compressor is operating at a flow pressure different from the maximum flow pressure.

An aspect combinable with any other aspect includes the following features. A third gas flow pathway is fluidically coupled to the second gas flow pathway and to a motive gas inlet of the gas-gas ejector. A first flow control valve is fluidically coupled to the third gas flow pathway and operatively coupled to the controller. To operate the gas-gas ejector, opening and closing of the first flow control valve is controlled.

An aspect combinable with any other aspect includes the following features. The first flow control valve, in an open state, is configured to divert a portion of the gas phase from the second gas flow pathway to the motive gas inlet of the gas-gas ejector. In a closed state, the first flow control valve is configured to cease flow of the portion of the gas phase from the second gas flow pathway to the motive gas inlet of the gas-gas ejector.

An aspect combinable with any other aspect includes the following features. A fourth gas flow pathway is fluidically coupled to the one of the multiple first gas flow pathways and to a drive gas inlet of the gas-gas ejector. A second flow control valve is fluidically coupled to the fourth gas flow pathway and operatively coupled to the controller. To operate the gas-gas ejector, opening and closing of the second flow control valve is controlled.

An aspect combinable with any other aspect includes the following features. The second flow control valve, in an open state, is configured to divert the gas phase from flowing to the second gas flow pathway to flowing to the driven gas inlet of the gas-gas ejector. In a closed state, the second flow control valve is configured to divert the gas phase from flowing to the driven gas inlet of the gas-gas ejector to flowing to the second gas flow pathway.

Certain aspects of the subject matter described here can be implemented as a method. A gas phase is flowed from a first GOSP through a first gas flow pathway to a second gas flow pathway at a first flow pressure. The gas phase from the second gas flow pathway is flowed to a central gas plant at a second flow pressure greater than the first flow pressure. The second gas flow pathway receives a gas phase from a second GOSP. While flowing the gas phase through the first gas flow pathway, a decrease in the first flow pressure below a threshold flow pressure is determined. In response, a gas-gas ejector, fluidically coupled to the first gas flow pathway and the second gas flow pathway, is operated to drive a flow of the gas phase to the central gas plant using the gas phase flowed through the second gas flow pathway at the second flow pressure as a motive gas.

An aspect combinable with any other aspect includes the following features. A gas compressor, fluidically coupled to the first gas flow pathway, flows the gas phase to the second gas flow pathway at the first flow pressure. To determine the decrease in the first flow pressure below the threshold flow pressure, a change in normal operation of the gas compressor is determined.

An aspect combinable with any other aspect includes the following features. Normal operation of the gas compressor includes an operation at a maximum flow pressure at which the gas compressor is rated to operate. To determine the change in the normal operation, it is determined that the gas compressor is operating at a flow pressure different from the maximum flow pressure.

An aspect combinable with any other aspect includes the following features. To operate the gas-gas ejector, a first flow control valve that controls flow through a third gas flow pathway, fluidically coupled to the second gas flow pathway, and to a motive gas inlet of the gas-gas ejector is opened to flow a portion of the gas phase from the second gas flow pathway to the motive gas inlet of the gas-gas ejector.

An aspect combinable with any other aspect includes the following features. To operate the gas-gas ejector, a second flow control valve that controls flow through a fourth gas flow pathway, fluidically coupled to the first gas flow pathway, and to a driven gas inlet of the gas-gas ejector is opened to divert the gas phase from flowing to the second gas flow pathway to flowing to the driven gas inlet of the gas-gas ejector.

An aspect combinable with any other aspect includes the following features. While operating the gas-gas ejector, a flow pressure through the first gas flow pathway is periodically monitored. In response, it is determined that the flow pressure of the gas phase exceeds the threshold flow pressure. In response to determining that the flow pressure of the gas phase exceeds the threshold flow pressure, the gas phase is flowed to the second gas flow pathway while avoiding flow of the gas phase through the gas-gas ejector.

An aspect combinable with any other aspect includes the following features. In response to determining that the flow pressure of the gas phase exceeds the threshold flow pressure, the gas is flowed from the second gas flow pathway to the central gas plant while avoiding flow of the gas from the second gas flow pathway through the gas-gas ejector.

Certain aspects of the subject matter described here can be implemented as a non-transitory computer-readable medium storing instructions executable by the one or more computer systems to perform operations. The operations include receiving signals representing flow pressure of a gas phase flowing through a first gas flow pathway from a first GOSP to a second gas flow pathway. While the gas phase is flowed from the first gas flow pathway to the second gas flow pathway, a gas phase is flowed to the second gas flow pathway from a second GOSP. At a first time instant, it is determined that the flow pressure is less than a threshold flow pressure. In response, control signals are transmitted to operate a gas-gas ejector, fluidically coupled to the first gas flow pathway and the second gas flow pathway, to drive a flow of the gas phase to the central gas plant using gas from the second gas flow pathway as a motive gas.

An aspect combinable with any other aspect includes the following features. A third gas flow pathway fluidically couples the second gas flow pathway to a motive gas inlet of the gas-gas ejector. A first flow control valve fluidically couples to the third gas flow pathway. To transmit control signals to operate the gas-gas ejector, control signals are transmitted to open the first flow control valve to divert a portion of the gas from the second gas flow pathway to the motive gas inlet of the gas-gas ejector.

An aspect combinable with any other aspect includes the following features. A fourth gas flow pathway fluidically couples the first gas flow pathway to a driven gas inlet of the gas-gas ejector. A second flow control valve fluidically couples to the fourth gas flow pathway. To transmit control signals to operate the gas-gas ejector, control signals are transmitted to open the second flow control valve to open the second flow control valve to divert the gas phase from flowing to the second gas flow pathway to flowing to the driven gas inlet of the gas-gas ejector.

An aspect combinable with any other aspect includes the following features. At a second time instant after the first time instant, it is determined that the flow pressure is greater than the threshold flow pressure. In response, control signals are transmitted to close the first flow control valve and the second flow control valve.

An aspect combinable with any other aspect includes the following features. To receive signals representing flow pressure of the gas phase flowing through the first gas flow pathway, signals are received from pressure sensors fluidically coupled to the first gas flow pathway.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

A GOSP implements high-pressure (HP) gas compressors to flow the gas phase separated from the multiphase hydrocarbons to the central gas plant where the gas phase is further processed. The central gas plant can be far away (e.g., several hundred kilometers away) from the GOSP. The HP gas compressors can be rated to operate at gas flow pressures needed to flow the gas phase over the long distances that separated the central gas plant and the GOSP. However, in some instances, the HP gas compressors do not operate at the related gas flow pressures to flow the gas phase to the central gas plant. For example, the operating gas flow pressure in the GOSP can be less than the related gas flow pressure of the HP gas compressor when the gas compressor is either starting up or shutting down (e.g., for preventative maintenance). In another example, the flow rate of the gas phase through the GOSP declines over time resulting in a lower gas flow rate, compared to the related gas flow rate, through the HP gas compressors. In such instances, the HP gas compressor will be put on a partially recycling more to prevent low suction flow rate, which can result in energy wastage. Also, in such instances, the gas phase that cannot be pumped by the HP gas compressor is treated as rejected gas, and is flowed to a flare system using which the rejected gases flared.

This disclosure describes techniques to minimize rejected gas that cannot be pumped from the GOSP to the central gas plant due to a reduction in gas flow pressure at which the HP gas compressors operate. The techniques described in this disclosure utilize available energy from other sources to provide gas flow pressure to flow the gas phase to the central gas plant, rather than implementing new sources that would add to energy usage. By implementing the techniques described here, a volume of gas phase that is recovered for processing in the central gas plant can be increased. Correspondingly, the volume of gas phase that is flared to the atmosphere can be decreased. Power required to operate the HP gas compressors in GOSPs, and, by extension, to operate the GOSPs themselves can be optimized. Overall, GOSPs can be operated more efficiently.

Figure 1:
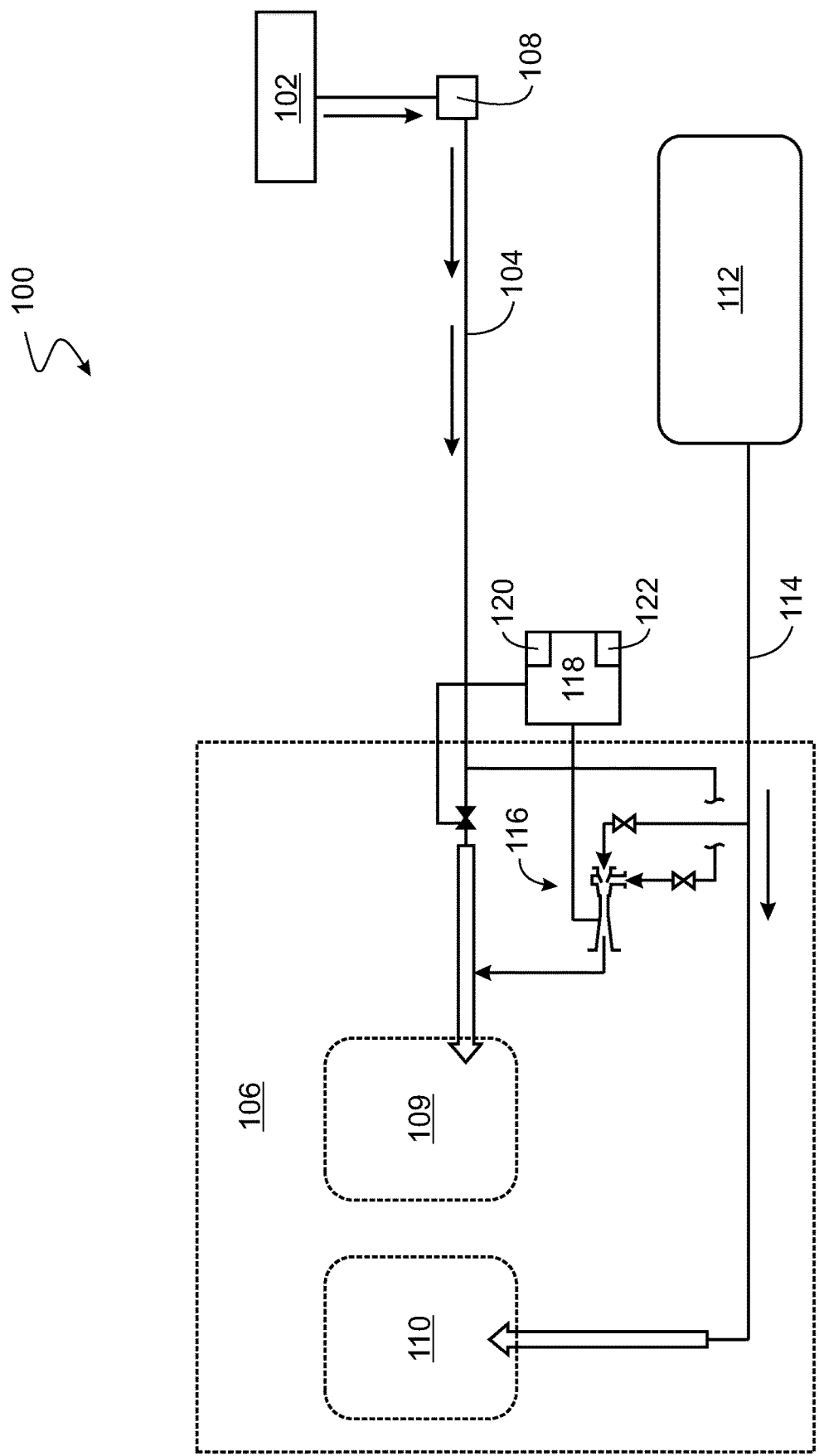
FIG. 1 is a schematic diagram of an implementation of a gas flow system.

FIG. 1 is a schematic diagram of an implementation of a gas flow system 100. The gas flow system 100 includes a GOSP 102 that can separate multiphase hydrocarbon into a gas phase and a liquid phase. The GOSP 102 can receive the multiphase hydrocarbon from a well system (not shown). The gas flow system 100 includes multiple gas flow pathways each of which can be implemented as a pipeline, flowline or other tubulars through which gas can be flowed and to which gas flow equipment (e.g., gas flow meters, pressure gauges, pumps, compressors or other gas flow equipment) can be fluidically coupled. In some implementations, the gas flow system 100 includes a first gas flow pathway 104 fluidically coupled to the GOSP 102. The first gas flow pathway 104 can receive the gas phase from the GOSP 102 and flow the gas phase to a central gas plant 106 at a first flow pressure.

In some implementations, the gas flow system 100 includes a gas compressor 108, an HP gas compressor, fluidically coupled to the first gas flow pathway 104. The gas compressor 108 is configured to pump the gas phase to the central gas plant at the first flow pressure. The gas compressor 108 is rated to operate at least at the first flow pressure. That is, the gas compressor 108 is designed and constructed such that the gas compressor 108 operates at optimal efficiency when the flow pressure of gas being pumped by the gas compressor 108 is at least at the first flow pressure. At flow pressures below the rated pressure, the gas compressor 108 operates inefficiently and may not be able to pump all of the gas phase received from the GOSP 102 to the central gas plant 106.

The central gas plant 106 includes multiple gas processing facility units, each configured to process gas received from a respective source. For example, the central gas plant 106 includes a GOSP gas processing facility 109 fluidically coupled to the first gas flow pathway 104. The GOSP gas processing facility 109 receives the gas phase from the GOSP 102 through the first gas flow pathway 104, and processes the gas phase (e.g., prepares the gas phase for shipping to sales destinations).

In some implementations, the central gas plant 106 includes a reservoir gas processing facility 110 that receives gas from a gas reservoir 112. For example, a gas well (not shown) is formed from the surface to a subsurface gas reservoir to produce natural gas entrapped in the gas reservoir 112. A second gas flow pathway 114 is fluidically coupled to the gas reservoir 112 (e.g., the gas well) and to the reservoir gas processing facility 110 at the central gas plant 106. Gas from the gas reservoir 112 is produced at a high pressure, and the flow of the gas to the second gas flow pathway 114 is controlled by a wellhead choke valve (not shown) installed at the gas well and, in some instances, other wells fluidically installed on the second gas flow pathway 114. The gas flows through the second gas flow pathway 114 from the gas reservoir 112 to the central gas plant 106 at a second flow pressure that is greater than the first flow pressure. That is, a pressure at which the gas flows from the gas reservoir 112 to the central gas plant 106 is greater than the pressure at which the HP gas compressor 108 pumps the gas phase from the GOSP 102 to the central gas plant 106.

When the flow rate of the gas phase through the GOSP 102 is optimal or when the HP gas compressor 108 operates at or above its rated flow pressure, the gas phase and the gas from the gas reservoir 112 can flow through the first gas flow pathway 104 and the second gas flow pathway 114, respectively, independent of each other. That is, under the optimal operating conditions described in this paragraph, the flow of the gas phase from the GOSP 102 is unaffected by the flow of the gas from the gas reservoir 112. However, in instances such as those described above, the flow rate of the gas phase through the GOSP 102 is not optimal or the HP gas compressor 108 does not operate at or above its rated flow pressure. In such instances, as described above, a portion of the gas phase may be rejected by flaring the portion to the atmosphere through a flare system (not shown).

To recover such portions of the gas phase and to avoid such flaring, a gas-gas ejector 116 can be implemented. The gas-gas ejector 116 is fluidically coupled to the first gas flow pathway 104 and the second gas flow pathway. The gas-gas ejector 116 is configured to drive gas flow using the gas from the gas reservoir 112 as a motive gas. The gas-gas ejector 116 uses high-pressure gas (e.g., gas from the gas reservoir 112) to drive flow of low-pressure gas (e.g., gas phase from the GOSP 102). The gas-gas ejector 116 uses a converging nozzle to increase gas velocity to transform high static pressure into velocity pressure. This conversion results in a low-pressure zone that provides the motive force to and claim a site fluid; in this case, the gas phase from the GOSP 102. The high-pressure gas and the low-pressure gas mix, and the mixed gas flows through a diffuser section that includes a diverging nozzle, which reduces the velocity and increases the pressure, thereby re-compressing the mixed gas.

In some implementations, the gas-gas ejector 116 is implemented only when the flow pressure through the first gas flow pathway 104 falls below a threshold flow pressure. For example, the threshold flow pressure can be the minimum flow pressure at which the HP gas compressor 108 is rated to operate or the minimum flow pressure at which the gas phase needs to flow through the GOSP 102. In another example, the threshold flow pressure can be the minimum flow pressure below which at least a portion of the gas phase needs to be rejected via the flare system.

In some implementations, the gas flow system 100 includes a controller operatively coupled to the components of the gas flow system 100, e.g., the GOSP 102, the gas flow pathways, the gas-gas ejector 116, to name a few. Also, the gas flow system 100 includes sensors (e.g., pressure gauges, flowmeters, combinations of them) fluidically coupled to the gas flow pathways that can sense flow parameters (e.g., flow pressure, flow velocity, other flow parameters) and can generate and transmit signals (e.g., electrical, electronic, the top signals) that represent the sensed flow parameters. The controller 118 includes one or more computer systems 120 and a computer-readable medium 122 storing instructions executable by the one or more computer systems 120 to perform operations described in this disclosure. The controller 118 can receive the signals that represent the sensed flow parameters from the various sensors deployed in the gas flow system 100.

As described below with reference to FIG. 2, the controller 118 can cause the gas-gas ejector 116 to be deployed only when the signals received from the sensors indicate that the flow pressure through the first gas flow pathway 104 is less than the threshold flow pressure. For example, the controller 118 can implement operations to determine a decrease in the first flow pressure below the threshold flow pressure. In response to determining the decrease in the first flow pressure below the threshold flow pressure, the controller 118 can cause the gas-gas ejector 116 to operate to drive a flow of the gas phase to the central gas plant 106 using gas from the gas reservoir 112 as a motive gas.

Figure 2:
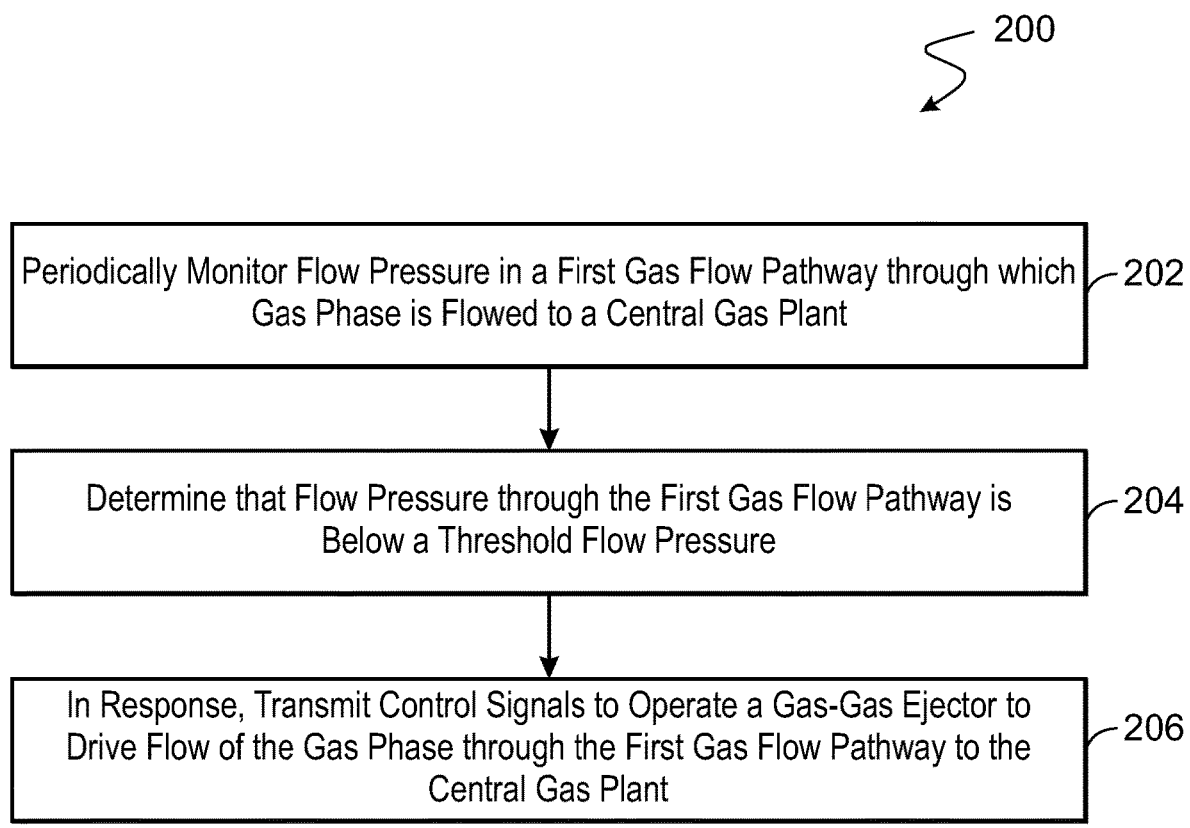
FIG. 2 is a flowchart of an example of a process of implementing the gas flow system of FIG. 1.

FIG. 2 is a flowchart of an example of a process 200 of implementing the gas flow system of FIG. 1. In some implementations, the process 200 can be performed by the controller 118. At 202, the controller 118 periodically monitors flow pressure in the first gas flow pathway 104 through which gas phase is flowed from the GOSP 102 to the central gas plant 106. For example, the controller 118 receives signals representing flow pressure of the gas flow flowing through the first gas flow pathway 104 from sensors fluidically coupled to the first gas flow pathway 104. While the gas phase is being flowed to the central gas plant 106 from the GOSP 102, gas from the gas reservoir 112 is, in parallel, being flowed through the second gas flow pathway 114 to the central gas plant 106.

In some implementations, the controller 118 stores, e.g., in the computer-readable medium 122, a value representing the threshold flow pressure. The threshold flow pressure value can be chosen based on the rated pressure at which the HP gas compressor 108 can optimally pump the gas phase through the first gas flow pathway 104 from the GOSP 102 to the central gas plant 106. The controller 118 can periodically (e.g., at a certain frequency such as once per second, once every 10 seconds, once every seconds, once a minute, and so on) compare flow pressure received from the sensors to the stored threshold flow pressure. As long as the controller 118 determines that the received flow pressure is greater than or equal to the threshold flow pressure, the gas-gas ejector 116 is not deployed, and flow of the gas phase through the first gas flow pathway 104 is unaffected by flow of the gas through the second gas flow pathway 114.

At 204, the controller 118 determines that flow pressure through the first gas flow pathway 104 is below the threshold flow pressure. For example, the controller 118 compares the flow pressure received from the sensors to the stored threshold flow pressure, and determines that the former is less than the latter. At 206, in response, the controller 118 transmits control signals to operate the gas-gas ejector 116 to drive flow of the gas phase through the first gas flow pathway 104 to the central gas plant 106 using the gas from the gas reservoir 114 as a motive gas.

Figure 3:
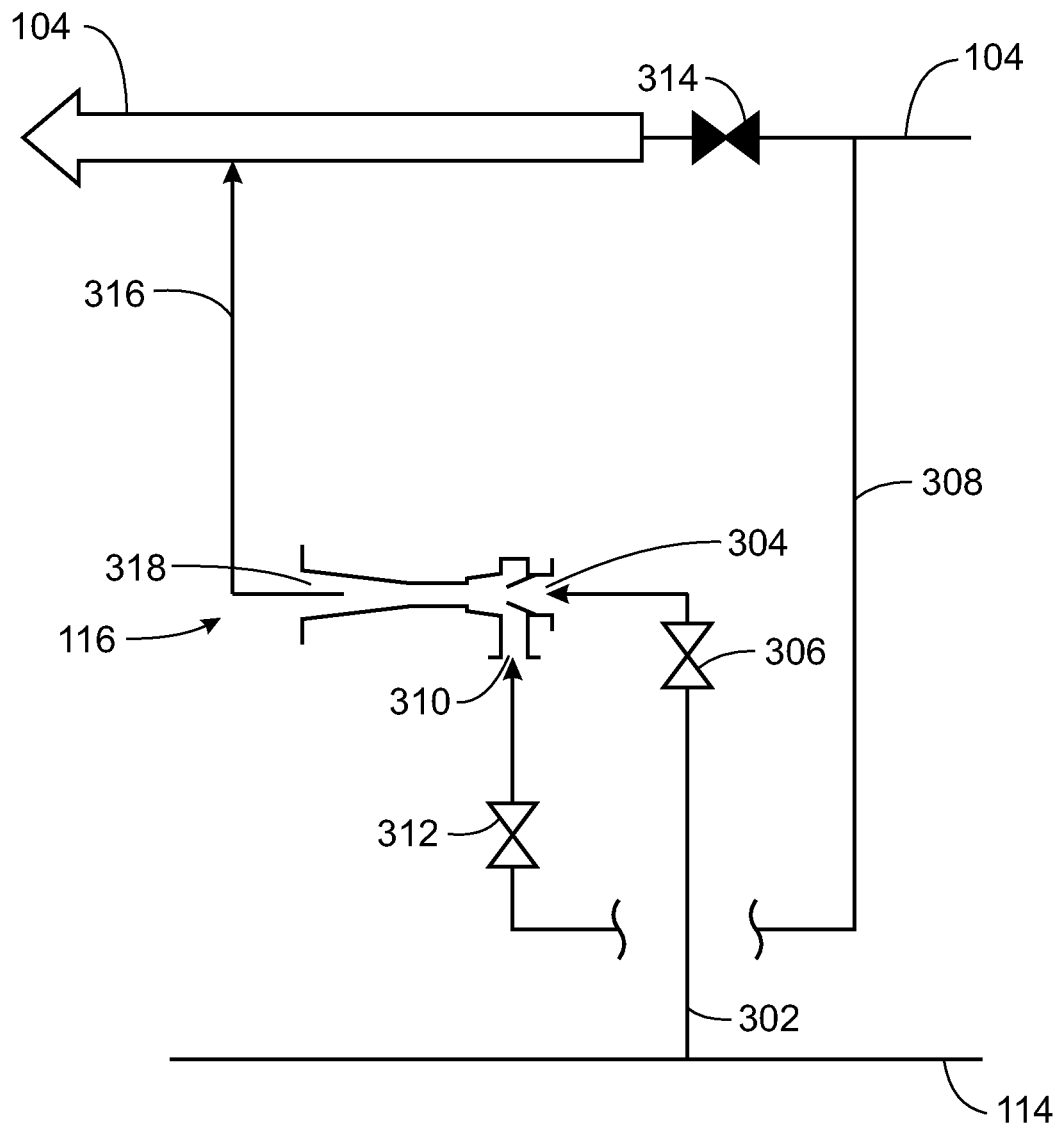
FIG. 3 is a schematic diagram of a gas-gas ejector used in the gas flow system of FIG. 1.

FIG. 3 is a schematic diagram of the gas-gas ejector 116 with the fluidic connections to the components of the gas flow system 100. The gas flow system 100 includes a third gas flow pathway 302 that fluidically couples the second gas flow pathway 114 to a motive gas inlet 304 of the gas-gas ejector 116. High-pressure gas (in this case, gas from the gas reservoir 112) flows into the motive gas inlet 304. A first flow control valve 306 is fluidically coupled to the third gas flow pathway 302. The first flow control valve 306 controls (i.e., permits or prevents) flow of the gas through the third gas flow pathway 302 from the second gas flow pathway 114 to the motive gas inlet 304. The first flow control valve 306 is operatively coupled to the controller 118, and can open or close based on and in response to control signals received from the controller 118. In response to the controller 118 transmitting control signals to the first flow control valve 306, the first flow control valve 306 opens, thereby diverting a portion of the gas from the gas reservoir 112 to the motive gas inlet 304.

The gas flow system 100 includes a fourth gas flow pathway 308 that fluidically couples the first gas flow pathway 104 to a driven gas inlet 310 of the gas-gas ejector 16. Low pressure gas (in this case, gas from the GOSP 102 when the HP gas compressor 108 is operating below the threshold flow pressure) flows into the driven gas inlet 310. A second flow control valve 312 controls (i.e., permits or prevents) flow of the gas through the fourth gas flow pathway 308 from the first gas flow pathway 104 to the driven gas inlet 310. The second flow control valve 312 is operatively coupled to the controller 118, and can open or close based on and in response to control signals received from the controller 118. In response to the controller 118 transmitting control signals to the second flow control valve 312, the second flow control valve 312 opens, thereby diverting the gas phase from the GOSP 102 to the driven gas inlet 310.

In some implementations, the gas flow system 100 can include another flow control valve 314 between the first gas flow pathway 104 and the central gas plant 106, specifically the GOSP gas processing facility 109. The flow control valve 314 is also operatively coupled to the controller 118, and can open or close based on and in response to control signals received from the controller 118. When the flow control valve 312 is open, the flow control valve 314 is closed. Under this arrangement, when the gas-gas ejector 116 is implemented, all gas phase from the GOSP 102 is flowed through the driven gas inlet 310. In other words, no gas phase is flowed directly to the central gas plant 106 while avoiding the gas-gas ejector 116. Also under this arrangement, the gas flow pathway 316 is operatively coupled to the outlet 318 of the gas-gas ejector 116 to flow the gas mixture (i.e., mixture of the gas phase from the GOSP 102 and the gas from the gas reservoir 112) exiting the gas-gas ejector 316 back to the first gas flow pathway 104 for final delivery to the central gas plant 106.

The earlier descriptions describe a scenario at a time instant in which the gas-gas ejector 116 is implemented because the flow pressure of the gas phase through the first gas flow pathway 104 has fallen below a threshold flow pressure. As described earlier, such pressure drop can occur, for example, because the HP gas compressor 108 is starting up or shutting down or is malfunctioning. Such pressure drop can also occur when the flow pressure of the gas phase flowing through the GOSP 102 drops. At a later time instant, the flow pressure of the gas phase through the first gas flow pathway 104 can increase to at or above the threshold flow pressure. Such pressure increase can occur, for example, because the HP gas compressor 108 is running optimally at the maximum flow pressure at which the HP gas compressor 108 is rated to operate. Such pressure increase can also occur because the gas phase is flowing optimally through the GOSP 102. In such scenarios, the gas-gas ejector 116 is no longer needed.

In response to determining that the flow pressure of the gas phase flow through the first gas flow pathway 104 is at or above the threshold flow pressure, the controller 118 can transmit signals to close the first flow control valve 306, close the second flow control valve 312 and open the flow control valve 314. In response, the portion of the gas from the gas reservoir 112, which was previously diverted to flow through the third gas flow pathway 302, can resume flowing entirely through the second gas flow pathway 114 to the central gas plant 106. Also, the gas phase from the GOSP 102, which was previously diverted to flow through the fourth gas flow pathway 308, can resume flowing entirely through the first gas flow pathway 104 to the central gas plant 106. In this manner, by periodically monitoring the pressure in the first gas flow pathway 104, the gas flow system 100 can implement the gas-gas ejector 116 as needed.

Figure 4:
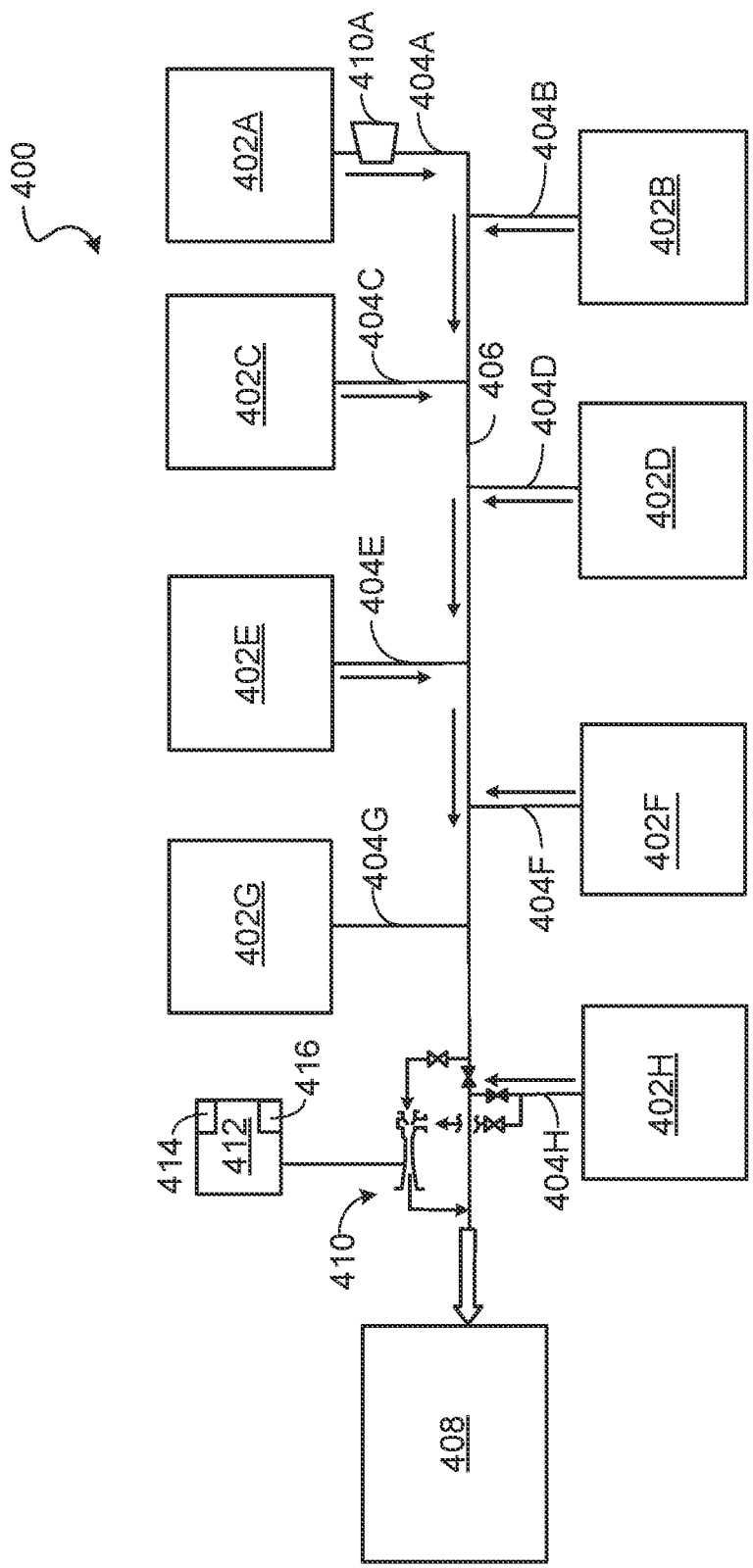
FIG. 4 is a schematic diagram of another implementation of a gas flow system.

FIG. 4 is a schematic diagram of another implementation of a gas flow system 400. The gas flow system 400 includes a network of multiple GOSPs (e.g., GOSPs 402A-H or fewer or more GOSPs), each of which can separate multiphase hydrocarbon into a gas phase and a liquid phase. Each GOSP can receive the multiphase hydrocarbon from a well system (not shown) or from multiple well systems (not shown). The gas flow system 400 includes multiple gas flow pathways each of which can be implemented as a pipeline, flowline or other tubulars through which gas can be flowed and to which gas flow equipment (e.g., gas flow meters, pressure gauges, pumps, compressors or other gas flow equipment) can be fluidically coupled. In some implementations, each GOSP in the gas flow system 400 includes a respective first gas flow pathway (e.g., first gas flow pathway 404a for GOSP 402A, first gas flow pathway 404B for GOSP 402B and similarly first gas flow pathways 404C-404H for GOSPs 402C-402H, respectively) fluidically coupled to the GOSP.

Each first gas flow pathway can receive the gas phase from a respective GOSP and flow the gas phase to a second gas flow pathway 406 at a respective first flow pressure. The second gas flow pathway 406 receives the gas phase from each first gas flow pathway and collectively flows the gas faces from the network of multiple GOSPs to a central gas plant 408 (similar to the central gas plant 106 of FIG. 1). The flow pressure of the gas phase through each respective first gas flow pathway can be different. The flow pressure of the gas phase through the second gas flow pathway 406 can be greater than the flow pressure through any of the individual first gas flow pathways.

In some implementations, the gas flow system 400 includes multiple gas compressors, e.g., each being an HP gas compressor similar to the gas compressor 108 of FIG. 1. Each first gas flow pathway originating from each GOSP can include a respective gas compressor (e.g., gas compressor 410A fluidically coupled to the first gas flow pathway 404A of the GOSP 402A). Each gas compressor is configured to pump the gas phase from the respective GOSP to the second gas flow pathway 406 at a respective first flow pressure. Each gas compressor is rated to operate at least at the first flow pressure. That is, the gas compressor 410A is designed and constructed such that the gas compressor 410A operates at optimal efficiency when the flow pressure of gas being pumped by the gas compressor 410A is at least at the first flow pressure. At flow pressures below the rated pressure, the gas compressor 410A operates inefficiently and may not be able to pump all of the gas phase received from the GOSP 402A to the second gas flow pathway 406.

The central gas plant 408 includes a gas processing facility unit configured to process gas received from the network of multiple GOSPs. Alternatively, the central gas plant 408 can include multiple gas processing facilities to which the gas phase received from the network can be distributed. In some implementations, the second gas flow pathway 406 is fluidically coupled to the one or more gas processing facility units.

When the flow rate of the gas phase through a GOSP is optimal or when the HP gas compressor of the gas phase operates at or above its rated flow pressure, all gas phase from the GOSP can be flowed to the second gas flow pathway 4064 argument debris to the central gas plant 408. However, in instances such as those described above, the flow rate of the gas phase through the GOSP is not optimal or the HP gas compressor does not operate at or above its rated flow pressure. In such instances, as described above, a portion of the gas phase may be rejected by flaring the portion to the atmosphere through a flare system (not shown).

To recover such portions of the gas phase and to avoid such flaring, a gas-gas ejector 410 (similar to the gas-gas ejector 116 of FIGS. 1 and 3) can be implemented. The gas-gas ejector 410 is fluidically coupled to the first gas flow pathway of the GOSP where the flow pressure is less than the threshold flow pressure. That is, the gas phase from such a first gas flow pathway is flowed to a driven gas inlet of the gas-gas ejector 410. The gas-gas ejector 410 is also fluidically coupled to the second gas flow pathway 406. That is, a portion of the gas phase from the second gas flow pathway 406 is flowed to a motive gas inlet of the gas-gas ejector for them. Similar to the gas-gas ejector 116 (FIGS. 1 and 3), the gas-gas ejector 410 is configured to drive gas flow using the gas phase from the second gas flow pathway 406 as a motive gas. The gas-gas ejector 116 uses high-pressure gas (e.g., gas phase from the second gas flow pathway 406) to drive flow of low-pressure gas (e.g., gas phase from the GOSP operating below the threshold flow pressure). The gas-gas ejector 410 uses a converging nozzle to increase gas velocity to transform high static pressure into velocity pressure. This conversion results in a low-pressure zone that provides the motive force to and claim a site fluid; in this case, the gas phase from the GOSP operating below the threshold flow pressure. The high-pressure gas and the low-pressure gas mix, and the mixed gas flows through a diffuser section that includes a diverging nozzle, which reduces the velocity and increases the pressure, thereby re-compressing the mixed gas.

In some implementations, the gas-gas ejector 410 is implemented only when the flow pressure through any one of the first gas flow pathways falls below a threshold flow pressure. For example, for the first gas flow pathway 404A, the threshold flow pressure can be the minimum flow pressure at which the HP gas compressor 410A is rated to operate or the minimum flow pressure at which the gas phase needs to flow through the GOSP 402A. In another example, the threshold flow pressure can be the minimum flow pressure below which at least a portion of the gas phase from the GOSP 402A needs to be rejected via the flare system.

In some implementations, the gas flow system 400 includes a controller 412 (similar to the controller 118 of FIG. 1) operatively coupled to the components of the gas flow system 400, e.g., each GOSP, each gas flow pathways, the gas-gas ejector 410, to name a few. Also, the gas flow system 400 includes sensors (e.g., pressure gauges, flowmeters, combinations of them) fluidically coupled to the gas flow pathways that can sense flow parameters (e.g., flow pressure, flow velocity, other flow parameters) and can generate and transmit signals (e.g., electrical, electronic, the top signals) that represent the sensed flow parameters. The controller 412 includes one or more computer systems 414 and a computer-readable medium 416 storing instructions executable by the one or more computer systems 414 to perform operations described in this disclosure. The controller 412 can receive the signals that represent the sensed flow parameters from the various sensors deployed in the gas flow system 400.

As described below with reference to FIG. 5, the controller 412 can cause the gas-gas ejector 410 to be deployed only when the signals received from the sensors indicate that the flow pressure through a first gas flow pathway is less than the threshold flow pressure. For example, the controller 412 can implement operations to determine a decrease in the first flow pressure below the threshold flow pressure. In response to determining the decrease in the first flow pressure below the threshold flow pressure, the controller 412 can cause the gas-gas ejector 410 to operate to drive a flow of the gas phase to the central gas plant 408 using gas phases collected from the other GOSPs in the network as a motive gas.

Figure 5:
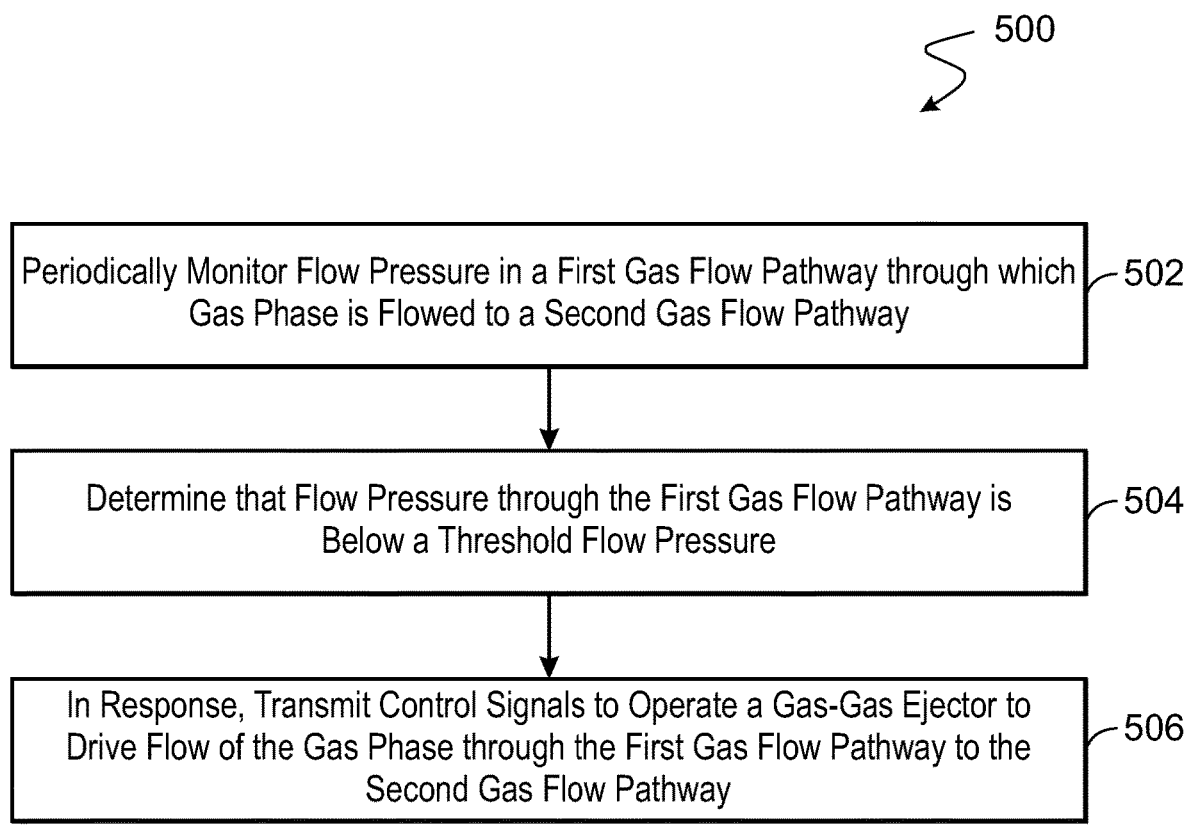
FIG. 5 is a flowchart of an example of a process of implementing the gas flow system of FIG. 4.

FIG. 5 is a flowchart of an example of a process 500 of implementing the gas flow system of FIG. 4. In some implementations, the process 500 can be performed by the controller 412. At 502, the controller 412 periodically monitors flow pressure in each of the first gas flow pathways through which gas phase is flowed from the respective GOSP to the central gas plant 408. For example, the controller 412 receives signals representing flow pressure of the gas flow flowing through each first gas flow pathway from sensors fluidically coupled to each first gas flow pathway. As described above, gas phase from each GOSP is being flowed through the respective first gas flow pathway to the second gas flow pathway 406.

In some implementations, the controller 412 stores, e.g., in the computer-readable medium 416, a value representing the threshold flow pressure. The threshold flow pressure value can be chosen based on the rated pressure at which each HP gas compressor can optimally pump the gas phase through the respective first gas flow pathway from the respective GOSP to the central gas plant 408. The controller 412 can periodically (e.g., at a certain frequency such as once per second, once every 10 seconds, once every 30 seconds, once a minute, and so on) compare flow pressure received from the sensors to the stored threshold flow pressure. As long as the controller 412 determines that the received flow pressure is greater than or equal to the threshold flow pressure, the gas-gas ejector 410 need not be deployed, and flow of the gas phase through each first gas flow pathway is unaffected by flow of the gas through the second gas flow pathway 406.

At 504, the controller 118 determines that flow pressure through a first gas flow pathway (e.g., first gas flow pathway 404H fluidically coupled to GOSP 402H) is below the threshold flow pressure. For example, the controller 412 compares the flow pressure received from the sensors to the stored threshold flow pressure, and determines that the former is less than the latter. At 506, in response, the controller 412 transmits control signals to operate the gas-gas ejector 410 to drive flow of the gas phase through the first gas flow pathway 404H to the central gas plant 408 using the gas phase from the second gas flow pathway 406 as a motive gas.

In some implementations of step 506, the controller 412 transmits an alert (e.g., a visual signal, and audio signal, and electronic signal, a data signal or any combination of them) to an operator indicating that the flow pressure through the first gas flow pathway 404H is below the threshold flow pressure. In response, the operator deploys the gas-gas ejector 410 between the GOSP 404H and the GOSP that is immediately upstream or downstream of the GOSP 404H. in the present example, because the GOSP 404H is most downstream of all the other GOSPs in the network, the gas-gas ejector 410 is deployed between the GOSP 404H and the central gas plant 408. In an alternative scenario, if the controller 412 had determined that the flow pressure through the first gas flow pathway 404B was below the threshold flow pressure, then the operator would deploy the gas-gas ejector 410 at the GOSP 404A or the GOSP 404C.

Figure 6:
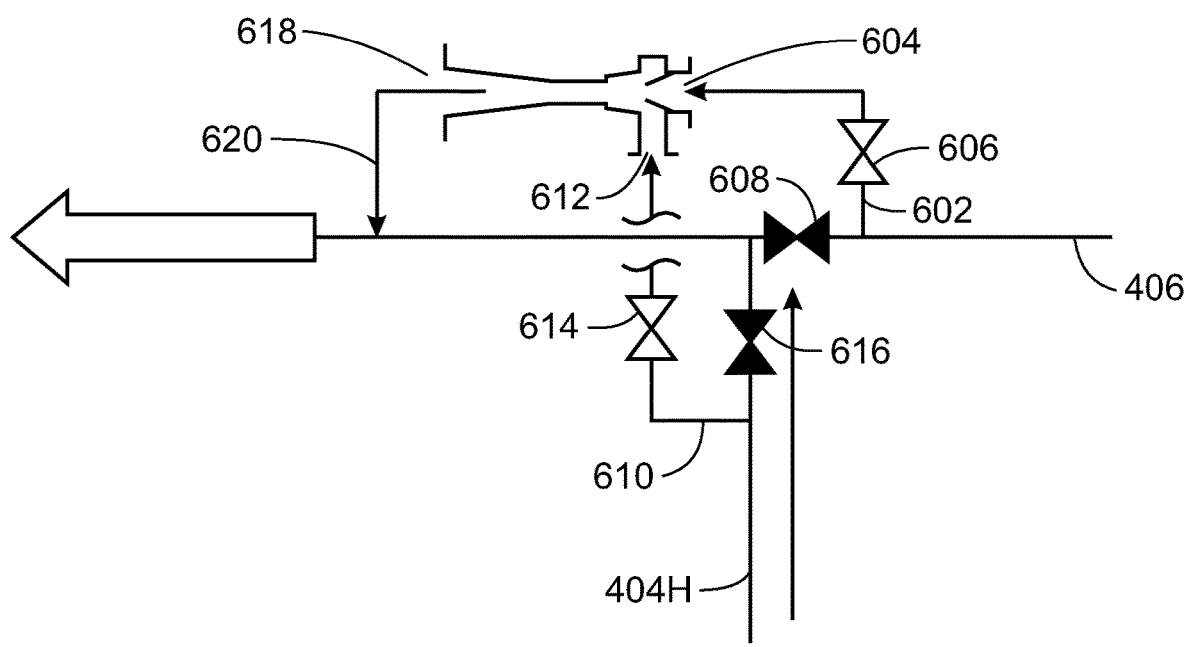
FIG. 6 is a schematic diagram of a gas-gas ejector used in the gas flow system of FIG. 4.

FIG. 6 is a schematic diagram of the gas-gas ejector 410 with the fluidic connections to the components of the gas flow system 100. The gas flow system 400 includes a third gas flow pathway 602 that fluidically couples the second gas flow pathway 406 to a motive gas inlet 604 of the gas-gas ejector 410. High-pressure gas (in this case, gas phase from the second gas flow pathway 406) flows into the motive gas inlet 604. A first flow control valve 606 is fluidically coupled to the third gas flow pathway 602. The first flow control valve 606 controls (i.e., permits or prevents) flow of the gas through the third gas flow pathway 602 from the second gas flow pathway 406 to the motive gas inlet 604. The first flow control valve 606 is operatively coupled to the controller 412, and can open or close based on and in response to control signals received from the controller 412. In response to the controller 412 transmitting control signals to the first flow control valve 606, the first flow control valve 606 opens, thereby diverting a portion of the gas phase from the second gas flow pathway 406 to the motive gas inlet 604.

The gas flow system 100 includes a fourth gas flow pathway 610 that fluidically couples the first gas flow pathway 404H to a driven gas inlet 612 of the gas-gas ejector 16. Low pressure gas (in this case, gas from the GOSP 402H when the HP gas compressor is operating below the threshold flow pressure) flows into the driven gas inlet 612. A second flow control valve 614 controls (i.e., permits or prevents) flow of the gas through the fourth gas flow pathway 610 from the first gas flow pathway 404H to the driven gas inlet 612. The second flow control valve 614 is operatively coupled to the controller 412, and can open or close based on and in response to control signals received from the controller 412. In response to the controller 412 transmitting control signals to the second flow control valve 614, the second flow control valve 614 opens, thereby diverting the gas phase from the GOSP 404H to the driven gas inlet 612.

In some implementations, the gas flow pathway 406 is operatively coupled to the outlet 618 of the gas-gas ejector 410 to flow the gas mixture (i.e., mixture of the gas phase from the GOSP 404H and the gas from the second gas flow pathway 406) exiting the gas-gas ejector 410, through a gas flow pathway 620, back to the second gas flow pathway 406 for final delivery to the central gas plant 106. Also, the gas flow system 400 includes a flow control valve 608 fluidically coupled to the second gas flow pathway 406 to control (i.e., permit or prevent) flow of the gas phase from the second gas flow pathway 406 to the third gas flow pathway 602. Also, the gas flow system 400 includes a flow control valve 616 fluidically coupled to the first gas flow pathway to control (i.e., permit or prevent) flow of the gas phase from the first gas flow pathway to the fourth gas flow pathway 610. The flow control valves 608 and 616 isolate the normal condition layout and have the flow directed to the gas-gas ejector 410.

The earlier descriptions describe a scenario at a time instant in which the gas-gas ejector 410 is implemented because the flow pressure of the gas phase through one of the first gas flow pathways (e.g., the first gas flow pathway 404H) has fallen below a threshold flow pressure. As described earlier, such pressure drop can occur, for example, because the HP gas compressor fluidically coupled to the first gas flow pathway is starting up or shutting down or is malfunctioning. Such pressure drop can also occur when the flow pressure of the gas phase flowing through the GOSP (e.g., GOSP 402H) drops. At a later time instant, the flow pressure of the gas phase through the first gas flow pathway can increase to at or above the threshold flow pressure. Such pressure increase can occur, for example, because the HP gas compressor fluidically coupled to the first gas flow pathway is running optimally at the maximum flow pressure at which the HP gas compressor is rated to operate. Such pressure increase can also occur because the gas phase is flowing optimally through the GOSP. In such scenarios, the gas-gas ejector 410 is no longer needed.

In response to determining that the flow pressure of the gas phase flow through the first gas flow pathway is at or above the threshold flow pressure, the controller 412 can transmit alerts similar to alerts described above indicating that the gas-gas ejector 410 is no longer needed. In response, the controller 410 can (either automatically without human intervention or in response to operator input) transmit signals to close the first flow control valve 606, close the second flow control valve 614 and open the flow control valves 608 and 616. In response, the portion of the gas from the second gas flow pathway 406, which was previously diverted to flow through the third gas flow pathway 602, can resume flowing entirely through the second gas flow pathway 406 to the central gas plant 408. Also, the gas phase from the GOSP, which was previously diverted to flow through the fourth gas flow pathway 610, can resume flowing entirely through the first gas flow pathway to the second gas flow pathway 406. In this manner, by periodically monitoring the pressure in each first gas flow pathway, the gas flow system 400 can implement the gas-gas ejector 410 as needed.

Thus, particular implementations of the subject matter have been described. Other implementations are within the scope of the following claims. In some implementations, features described with reference to different implementations can be combined into a single implementation. For example, while gas is being flowed from a network of multiple GOSPs to the central gas plant, gas can, in parallel, be flowed from a gas reservoir to the same central gas plant. In such implementations, if a flow pressure of gas phase from a GOSP drops below a threshold flow pressure, then the gas-gas ejector can be used to drive the flow of gas phase from that GOSP using either the gas phase from the second gas flow pathway that collects gas phases from all the GOSPs in the network or the gas from the gas reservoir. In some implementations, a mixture of gas from the second gas flow pathway and gas from the gas reservoir can be used as motive fluid to operate the gas-gas ejector.

The invention claimed is:

1. A method comprising:
   flowing a gas phase from a gas oil separation plant (GOSP) to a central gas plant through a first gas flow pathway that is fluidically coupled to a gas compressor, wherein under a normal operation of the compressor, the compressor is configured to flow the gas phase through the first gas flow pathway at a first flow pressure;
   flowing gas from a gas reservoir to the central gas plant through a second gas flow pathway at a second flow pressure, the first gas flow pathway separate from the second gas flow pathway;
   while flowing the gas phase through the first gas flow pathway, determining a change in the normal operation of the gas compressor based on a decrease in the first flow pressure below a threshold flow pressure; and
   in response to determining the change in the normal operation of the gas compressor, operating a gas-gas ejector, fluidically coupled to the first gas flow pathway and the second gas flow pathway, to drive a flow of the gas phase to the central gas plant using gas from the gas reservoir as a motive gas.

2. The method of claim 1, wherein the normal operation of the gas compressor comprises an operation at a maximum flow pressure at which the gas compressor is rated to operate, wherein determining the change in the normal operation comprises determining that the gas compressor is operating at a flow pressure different from the maximum flow pressure.

3. The method of claim 1, wherein operating the gas-gas ejector comprises opening a first flow control valve that controls flow through a third gas flow pathway fluidically coupled to the second gas flow pathway and to a motive gas inlet of the gas-gas ejector to flow a portion of the gas from the gas reservoir to the motive gas inlet of the gas-gas ejector.

4. The method of claim 3, wherein operating the gas-gas ejector comprises opening a second flow control valve that controls flow through a fourth gas flow pathway fluidically coupled to the first gas flow pathway and to a driven gas inlet of the gas-gas ejector to divert the gas phase from flowing to the central gas plant to flowing to the driven gas inlet of the gas-gas ejector.

5. The method of claim 1, further comprising:
   while operating the gas-gas ejector, periodically monitoring a flow pressure through the first gas flow pathway;
   in response to periodically monitoring the flow pressure, determining that the flow pressure of the gas phase exceeds the threshold flow pressure; and
   in response to determining that the flow pressure of the gas phase exceeds the threshold flow pressure, flowing the gas phase to the central gas plant while avoiding flow of the gas phase through the gas-gas ejector.

6. The method of claim 5, further comprising, in response to determining that the flow pressure of the gas phase exceeds the threshold flow pressure, flowing the gas from the gas reservoir to the central gas plant while avoiding flow of the gas from the gas reservoir through the gas-gas ejector.

* * * * *